(12) United States Patent
Bang

(10) Patent No.: US 7,938,474 B2
(45) Date of Patent: May 10, 2011

(54) TAILGATE FOR VEHICLE

(75) Inventor: Jaechul Bang, Seoul (KR)

(73) Assignee: Kia Motors Corporation, Seoul (KR)

( * ) Notice: Subject to any disclaimer, the term of this patent is extended or adjusted under 35 U.S.C. 154(b) by 0 days.

(21) Appl. No.: 11/965,561

(22) Filed: Dec. 27, 2007

(65) Prior Publication Data
US 2009/0108611 A1 Apr. 30, 2009

(30) Foreign Application Priority Data

Oct. 31, 2007 (KR) .................. 10-2007-0110153

(51) Int. Cl.
*B60J 5/10* (2006.01)
(52) U.S. Cl. ............... 296/180.1; 296/56; 296/146.8
(58) Field of Classification Search ............. 296/180.1, 296/180.2, 50, 56, 51, 146.8
See application file for complete search history.

(56) References Cited

U.S. PATENT DOCUMENTS

| 7,503,619 | B2 * | 3/2009 | Werner | 296/146.8 |
| 7,537,267 | B2 * | 5/2009 | Tanaka et al. | 296/146.6 |
| 2005/0046229 | A1 * | 3/2005 | Yamada et al. | 296/146.8 |
| 2007/0200389 | A1 * | 8/2007 | Ina et al. | 296/180.1 |

FOREIGN PATENT DOCUMENTS

| JP | 2001-180537 | 7/2001 |
| JP | 2001-347969 | 12/2001 |
| JP | 2002-46658 A | 2/2002 |
| JP | 2004-106765 | 4/2004 |

* cited by examiner

*Primary Examiner* — Joseph D Pape
(74) *Attorney, Agent, or Firm* — Morgan, Lewis & Bockius LLP

(57) ABSTRACT

A tailgate for a vehicle includes an upper panel having a shape such that it acts as a spoiler, and a lower panel attached to the upper panel. The lower panel may define a windshield mounting hole. The lower panel may include two side pillars and an upper crossing member, the side pillars and upper crossing member defining the windshield mounting hole. The upper crossing member and the side pillars may be welded to the upper panel.

6 Claims, 2 Drawing Sheets

TAILGATE FOR VEHICLE

CROSS-REFERENCE TO RELATED APPLICATIONS

The present application is based on, and claims priority from, Korean Application Serial Number 10-2007-0110153, filed on Oct. 31, 2007, the disclosure of which is hereby incorporated by reference herein in its entirety.

FIELD OF THE INVENTION

The present invention relates to a vehicle tailgate.

BACKGROUND OF THE INVENTION

A spoiler is generally fixed to an upper portion of a vehicle tailgate. A typical spoiler is made of plastic, and is separately formed by injection molding and then mounted on the vehicle. This provides manufacturing difficulties and is costly.

SUMMARY OF THE INVENTION

A tailgate for a vehicle includes an upper panel having a shape such that it acts as a spoiler, and a lower panel attached to the upper panel. The lower panel may define a windshield mounting hole. The lower panel may include two side pillars and an upper crossing member, the side pillars and upper crossing member defining the windshield mounting hole. The upper crossing member and the side pillars may be welded to the upper panel.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

A preferred embodiment of the present invention will be described below with reference to accompanying drawings.

Referring to FIGS. 1 to 4, a tailgate according to an embodiment of the present invention includes an upper panel 5 and a lower panel 7. Upper panel 5 forms an upper portion of tailgate 1, and is positioned above a rear windshield glass-mounting hole 3 in tailgate 1. Upper panel 5 has a shape such that it itself acts as a spoiler. Lower panel 7 is fixed to the lower portion of upper panel 5, to form tailgate 1.

Figure 1:
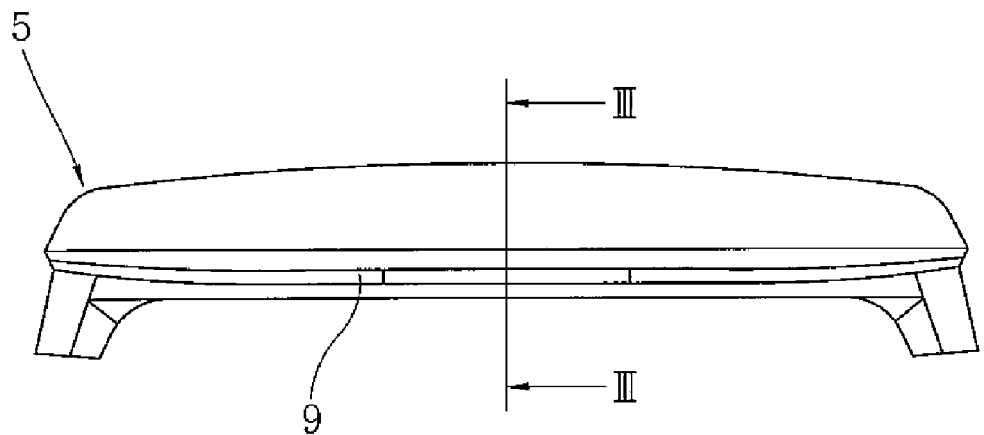
FIG. 1 is a front view of an upper panel of a tailgate according to an embodiment of the present invention.
Figure 2:
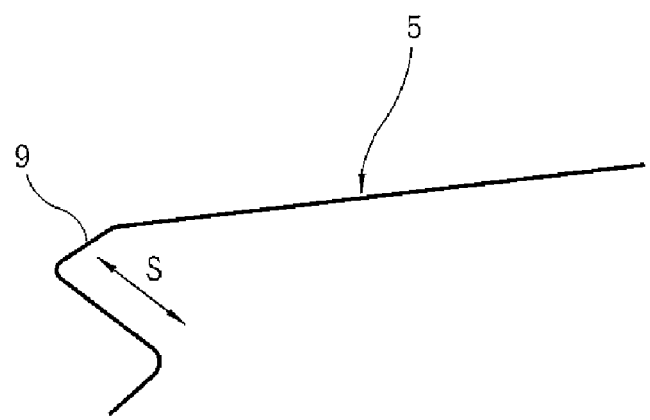
FIG. 2 is a cross-sectional view taken along a line III-III of FIG. 1.
Figure 3:
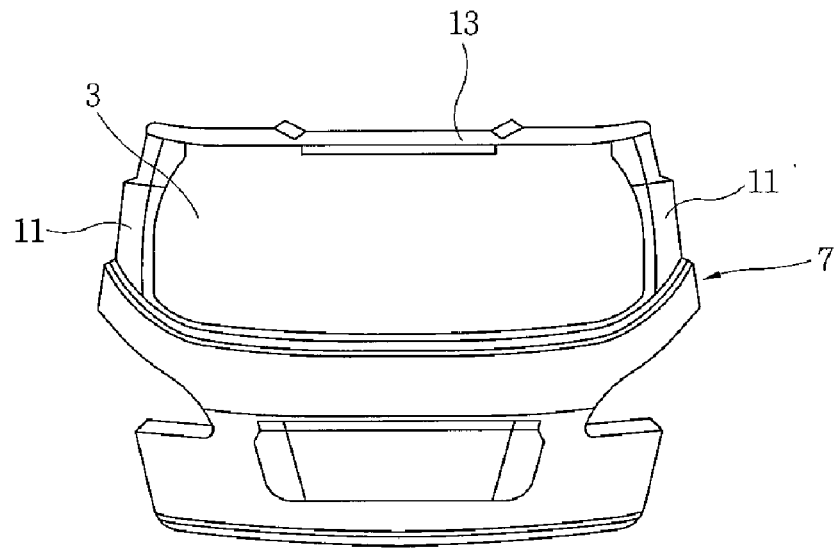
FIG. 3 is a front view of a lower panel of the tailgate according to an embodiment of the present invention.
Figure 4:
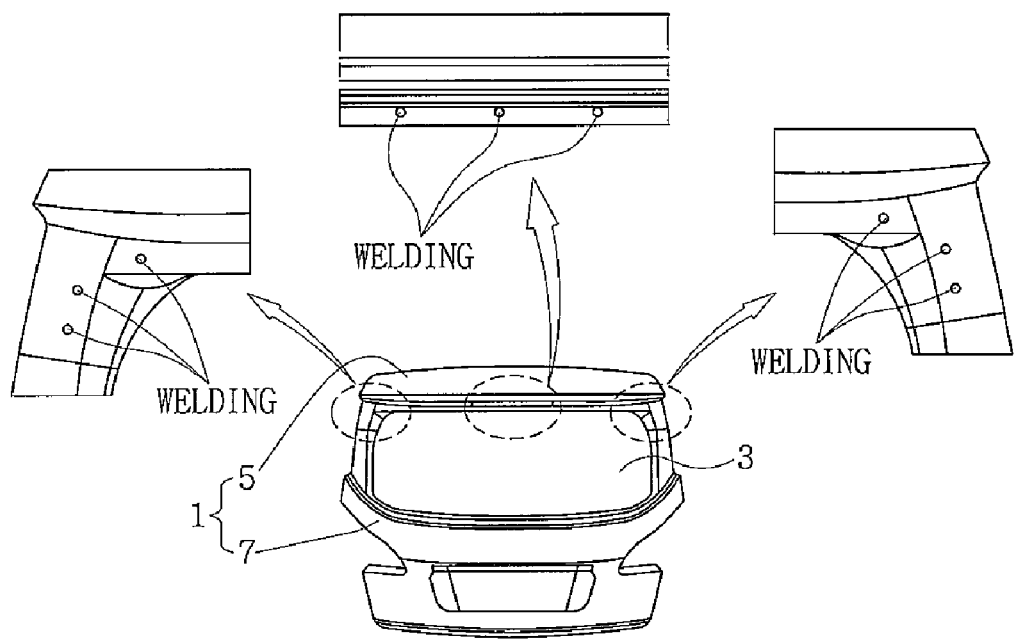
FIG. 4 is a view showing the tailgate for a vehicle according to an embodiment of the present invention.

It is preferred that upper panel 5 and lower panel 7 are separately formed, because a depth S for forming the shape of the spoiler shown in FIG. 2 is considerably large. For this reason, unless upper panel 5 and lower panel 7 are separately formed, there may be problem in that a spoiler-shaped portion 9 is torn. However, the present invention is not limited to separately made panels 5, 7.

Lower panel 7 includes two side pillars 11 and an upper crossing member 13, which are integrally formed with each other, so as to define rear windshield glass-mounting hole 3.

That is, in some embodiments, rear windshield glass-mounting hole 3 is not formed by upper panel 5, but is completely defined by the lower panel 7. Accordingly, lower panel 7 is strong, and is easily handled during the manufacture of tailgate 1.

Upper crossing member 13 and the upper portions of the two side pillars 11 of lower panel 7 may be welded to upper panel 5.

According to the above-mentioned tailgate 1 for a vehicle, since spoiler-shaped portion 9 is simultaneously formed during the formation of upper panel 5, a separate part does not need to be manufactured and assembled. Therefore, it is possible to reduce the manufacturing cost of the vehicle.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A tailgate for a vehicle, comprising:
    an upper outer panel positioned above a rear windshield glass-mounting hole of the vehicle and having a spoiler monolithically formed with the upper outer panel and protruding from an upper portion of the upper outer panel in a rearward direction of the vehicle and returning to a lower portion of the upper outer panel, whereby the spoiler forms an open channel in the upper outer panel; and
    a lower outer panel separately formed from the upper outer panel and welded to the upper outer panel;
    wherein the lower outer panel comprises two side pillars and an upper crossing member, the side pillars and the upper crossing member defining the windshield mounting hole; and
    wherein the open channel of the upper outer panel opens toward an outer surface of the lower outer panel.

2. The tailgate as defined in claim 1, wherein the lower outer panel defines the windshield mounting hole.

3. The tailgate as defined in claim 1, wherein the lower outer panel surrounds the windshield mounting hole on all sides.

4. The tailgate as defined in claim 1, wherein the upper crossing member and the side pillars are welded to the upper outer panel.

5. A tailgate for a vehicle, comprising:
    an upper outer panel positioned above a rear windshield glass-mounting hole of the vehicle and including a protruding portion protruding from an upper portion of the upper outer panel in a rearward direction along a transverse direction of the vehicle and returning to a lower portion of the upper outer panel, whereby the protruding portion forms an open channel in the upper outer panel; and
    a lower outer panel separately formed from the upper outer panel and fastened to the upper outer panel, wherein the lower outer panel defines the windshield glass-mounting hole to receive a windshield glass therein; and
    wherein the open channel of the upper outer panel opens toward an outer surface of the lower outer panel.

6. The tailgate as defined in claim 5, wherein the lower outer panel includes an upper crossing member disposed at an upper middle portion of the upper outer panel to support the upper outer panel.

* * * * *